United States Patent [19]

Ekner et al.

[11] Patent Number: 6,092,159
[45] Date of Patent: Jul. 18, 2000

[54] IMPLEMENTATION OF CONFIGURABLE ON-CHIP FAST MEMORY USING THE DATA CACHE RAM

[75] Inventors: Hartvig Ekner, Holte; Peter Korger, KBH, both of Denmark

[73] Assignee: LSI Logic Corporation, Milpitas, Calif.

[21] Appl. No.: 09/073,047

[22] Filed: May 5, 1998

[51] Int. Cl.⁷ .................................................... G06F 12/16
[52] U.S. Cl. ........................ 711/152; 711/133; 711/159; 711/134; 711/141; 711/142; 711/163
[58] Field of Search ..................................... 711/145, 144, 711/133, 159, 200, 152, 134, 141, 142, 163

[56] References Cited

U.S. PATENT DOCUMENTS

| | | | |
|---|---|---|---|
| 5,025,366 | 6/1991 | Baror | 711/44 |
| 5,404,482 | 4/1995 | Stamm et al. | 711/145 |
| 5,526,510 | 6/1996 | Akkary et al. | |
| 5,627,992 | 5/1997 | Baror | 711/133 |
| 5,974,508 | 10/1999 | Maheshwari | 711/133 |

OTHER PUBLICATIONS

Stiliadis et al., "Selective Victim Caching: A Method to Improve the Performance of Direct–Mapped Caches," Proceedings of the 27th Annual Hawaii International Conference on System Sciences, 1994, pp. 412–421.

*Primary Examiner*—John W. Cabeca
*Assistant Examiner*—Christian P. Chace
*Attorney, Agent, or Firm*—Conley, Rose & Tayon

[57] ABSTRACT

A write-through data cache which incorporates a line addressable locking mechanism. By executing a software lock instruction or unlock instruction, a microprocessor controls the locking or unlocking of individual cache lines in the data cache. A locked cache line is not subject to deallocation. By locking a plurality of lines in the data cache, the microprocessor configures a reserved area of guaranteed fast access memory within the data cache. The data cache includes a mechanism to disable write-through of write requests on a line addressable basis. By executing a software write-through disable instruction, the microprocessor commands the data cache to disable write through operations on an individual cache line. By disabling write-through on cache lines which have been locked, the plurality of locked lines behaves like a true fast-access internal memory with guaranteed access time: write requests targeting the reserved area of locked lines are not written through to the bus interface.

11 Claims, 3 Drawing Sheets

| Lock Control Bit 102 | Writethrough Control Bit 104 | Address Tag 106 |
|---|---|---|

↘ 100-l

| | | |
|---|---|---|
| 100-1 — L | D | Address Tag #1 |
| 100-2 — U | E | Address Tag #2 |
| 100-3 — L | E | Address Tag #3 |
| . | . | . |
| . | . | . |
| . | . | . |
| 100-N — U | E | Address Tag #N |

← Address Tag & State Array 100

IMPLEMENTATION OF CONFIGURABLE ON-CHIP FAST MEMORY USING THE DATA CACHE RAM

BACKGROUND OF THE INVENTION

1. Field of the Invention

This invention relates to field of microprocessors and more particularly to a microprocessor employing a data cache with mechanisms for line locking and line addressable disabling of write-through operations.

2. Description of the Related Art

Microprocessor based systems typically include cache memories to improve the average bandwidth of memory transactions. A cache memory may be configured as an internal or external cache. An internal cache, i.e. a cache embedded within the microprocessor substrate, may be accessed faster than an external cache, however due to the necessity to conserve die area, an internal cache has significantly less storage capacity than an external cache. Many microprocessor based systems employ both an internal cache and external cache. Also, microprocessors quite often employ two distinct internal caches: an instruction cache for accessing instructions, and a data cache for accessing data (operands).

In general, a cache memory is a high-speed memory unit interposed between a microprocessor (or microprocessor core) and a slower system memory. A cache memory operates according to the assumption that the microprocessor is likely to revisit, i.e. read or write, memory locations in the vicinity of a current access to system memory. Thus, in response to a memory access request asserted by the microprocessor (or microprocessor core), the cache memory reads a whole neighborhood of memory locations in the vicinity of the current access address into the cache memory provided this neighborhood is not already present in the cache memory. Future accesses to this address neighborhood are satisfied by the cache memory with greatly reduced access time.

A cache memory includes a plurality of lines, where each line stores two or more words of data. System memory is also viewed as being organized into consecutive lines. Each line of the cache memory has associated with it an address tag that uniquely identifies which line of system memory it is a copy of. When the microprocessor (or microprocessor core) asserts a memory read request, the cache memory performs an address tag comparison to determine whether a copy of the requested data resides in a line of the cache memory. If present, the data is accessed directly from the cache memory. This event is referred to as a cache read "hit". If not present, a line containing the requested data is retrieved from system memory and stored in the cache memory. The requested word is also supplied to the microprocessor. This event is referred to as a cache read "miss".

When the microprocessor asserts a write request, the cache memory performs an address tag comparison to determine whether the line into which data is to be written resides in the cache memory. If the line is present in the cache memory, the data is written directly into the line. This event is referred to as a cache write "hit". If the line into which data is to be written does not exist in the cache memory, the data is written to system memory, and the targeted line in system memory is fetched into the cache memory. This event is referred to as a cache write "miss". A line which is overwritten or copied out of the cache memory when new line of data is stored in the cache memory is referred to as a victim line.

Cache memories can be optimized according to a number of different techniques. One aspect that affects system performance and design complexity is the handling of writes operations. As explained previously, because two copies of a particular piece of data or instruction code can exist, one in system memory and a duplicate copy in the cache, writes to either the system memory or the cache memory can result in an incoherence between the two storage units. For example, consider the case in which the same data is initially stored at a predetermined address in both the cache memory and the system memory. If the processor subsequently initiates a write cycle to store a new data item at the predetermined address, a cache write "hit" occurs and the processor proceeds to write the new data into the cache memory at the predetermined address. Since the data is modified in the cache memory but not in system memory, the cache memory and system memory become incoherent.

An incoherence between the cache memory and system memory during processor writes can be prevented or handled by implementing one of several commonly employed techniques. In a first technique, a "write-through" cache guarantees consistency between the cache memory and system memory by writing the same data to both the cache memory and system memory. The contents of the cache memory and system memory are always identical, and thus the two storage systems are always coherent. In a second technique, a "write-back" cache handles processor writes by writing only to the cache memory, and setting a "dirty" bit associated with a cache line to indicate that one or more entries within the cache line have been altered by the microprocessor. The "dirty", i.e. altered line is later written back to system memory to re-establish coherency.

A microprocessor employing a cache memory experiences an average increase in memory access bandwidth and a consequent increase processing capacity. However, some critical processing tasks, especially in embedded microprocessor applications, require guaranteed fast memory access times. For example, an exception handler for real-time events may require guaranteed fast memory access for specific code and/or data sections. One traditional answer to the need for guaranteed fast memory access has been to add a dedicated high-speed memory either internal or external to the microprocessor substrate. However, a number of disadvantages are inherent in this approach. If the dedicated high-speed memory resides on the microprocessor substrate, its memory capacity is limited by the constraint of conserving semiconductor substrate area. Furthermore, once embedded into the microprocessor substrate, the capacity of the high-speed memory is forever fixed. This is clearly a disadvantage if software applications have varying demands for the high-speed memory. If the dedicated high-speed memory resides external to the microprocessor substrate, its speed generally will not be adequate to allow full speed processing (similar to processing with a 100% cache hit rate).

Another solution to the problem of providing guaranteed fast memory access is afforded by cache memories which allow a line by line locking mechanism. Locking a cache line corresponding to a given address tag implies that the line will not be deallocated by the cache memory. Generally, the microprocessor (or microprocessor core) asserts a write cycle to ensure the allocation of a cache line corresponding to a desired address, and then locks the cache line. All future reads and writes to the address range given by the locked cache line will be satisfied directly from the cache memory.

Furthermore, by locking a plurality of cache lines, a reserved area of the data cache is created which functions as a dedicated fast access internal memory. The access time to the reserved area is equal to the cache hit access time. And the size of the reserved area may be configured to match the requirements of the processing task being performed. However, for write-through cache memories, write accesses to the reserved area (i.e. the plurality of locked lines) are presented to the bus interface of the microprocessor and need to be serviced by system memory. Since the reserved area is locked for the duration of the application and will therefore satisfy all future reads directly without accessing system memory, the write through operations to system memory are wasting unnecessary bus cycles, and lowering system performance. Also, the address range (or space) corresponding to the reserved area must be imaged by physical addresses in the external memory system in order to accept the write requests passed through the cache memory. Memory locations mapped to the imaged physical addresses are never read by the data cache and thus are wasted.

SUMMARY OF THE INVENTION

The problems outlined above are in large part solved by a write-through cache which incorporates line locking and line addressable disabling of write through operations. In one embodiment, the write-through cache comprises a data cache integrated within a microprocessor. The microprocessor is able to control the locking and unlocking of individual cache lines in the data cache by executing a software lock instruction or unlock instruction respectively. While a line is locked, the line is locked in the cache and is not subject to replacement. By locking a plurality of lines in the data cache, the microprocessor may configure a reserved area of guaranteed fast access memory within the data cache. In addition, the data cache includes a mechanism to disable write-through of write requests on a line addressable basis. By executing a software write-through disable instruction, the microprocessor commands data cache to disable write through operations on an individual cache line. By disabling write-through on cache lines which have been locked, the plurality of locked lines behaves like a true fast-access memory internal to the microprocessor: write requests targeting the reserved area of locked lines are not written through to the bus interface. Therefore, the system bus, being liberated from the write-through traffic corresponding to the reserved area, may advantageously operate with higher effective transfer bandwidth. Furthermore, the microprocessor may advantageously configure a reserved area of guaranteed fast-access memory within the data cache using addresses outside the address space of the external memory system.

In a second embodiment, a write-through cache employing the same principles of line locking and line addressable disabling of write-through is configured externally to a microprocessor.

Broadly speaking, the present invention contemplates a data cache comprising a first bus, a second bus, a cache memory including a plurality of lines, and a cache controller. The cache controller couples to the first bus, the second bus, and the cache memory. The cache controller is configured to receive a lock signal from the first bus, and in response to the lock signal to lock a first line of the plurality of lines in the cache memory. Furthermore, the cache controller is configured to receive a write request asserted on the first bus. The write request includes a first address and first data. The cache controller updates the first line with the first data if the first address matches an address tag associated with the first line. The cache controller is also configured to selectively write through to the second bus write requests which hit the first line depending on a first control indication.

The invention further contemplates a method for controlling a data cache. The method includes the steps of (i) locking a first line of the data cache; (ii) receiving a first address and first data associated with a first write request; (iii) updating the first line in response to the first address matching an address tag associated with the first line; (iv) selectively performing a write through of the first write request to system memory depending on a first control indication associated with the first line.

BRIEF DESCRIPTION OF THE DRAWINGS

Other objects and advantages of the invention will become apparent upon reading the following detailed description and upon reference to the accompanying drawings in which.

Figure 1:
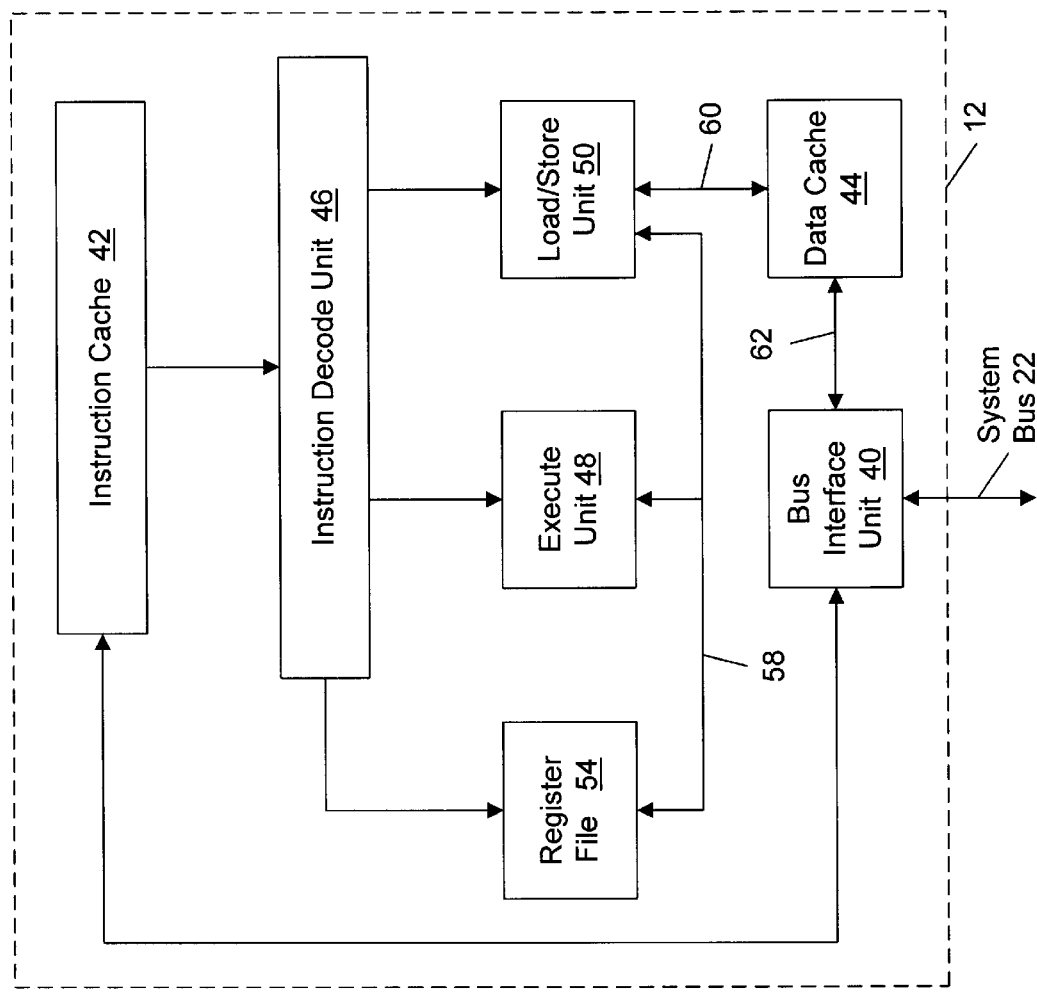
FIG. 1 is a block diagram of an exemplary microprocessor which includes a data cache.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the figures, FIG. 1 shows a block diagram of one embodiment of a microprocessor 12. Microprocessor 12 includes a bus interface unit 40, an instruction cache 42, a data cache 44, an instruction decode unit 46, an execute unit 48, load/store unit 50, and register file 54. Bus interface unit 40 is coupled to instruction cache 42, data cache 44, and system bus 22. Instruction decode unit is coupled to instruction cache 42, execute unit 48, load/store unit 50, and register file 54. Execute unit 48, load/store unit 50, and register file 54 are coupled together through a result/operand bus 58. Load/store unit 50 is coupled to data cache 44.

Bus interface unit 40 effects communications between microprocessor 12 and other devices coupled to system bus 22. For example, instruction code fetches which miss instruction cache 42 are transferred from system memory 18 (shown in FIG. 5) to instruction cache 42 through bus interface unit 40. Additionally, bus interface unit 40 mediates the transfer of data between data cache 44 and system memory 18.

Instruction cache 42 is configured to fetch program instruction from system memory 18 through bus interface unit 40. Instruction decode unit 46 is configured to decode instructions received from instruction cache 42 and issue decoded representations of these instructions to execute unit 48 and/or load/store unit 50. Furthermore, instruction decode unit 46 detects the register operands required by an instruction and issues operand request signals to register file 54. In response to the operand request signals, register file 54 forwards the requested operands to execute unit 48 and/or load/store unit 50 through result/operand bus 58. Furthermore, register file 54 is configured to receive (a) the results of instruction execution, or (b) data operands provided by load/store unit 50, through results/operand bus 58.

Execute unit 48 includes computational logic which is operable to perform a variety of computational operations such as arithmetic and logic operations in response to the decoded representations of instructions supplied by instruction decode unit 46. Load/store unit 50 is configured to execute memory load and store operations. Thus load/store unit 50 is coupled to data cache 44 through a first internal bus 60. Load/store unit 50 asserts memory access requests to data cache 44 on first internal bus 60.

Generally speaking, data cache 44 is a write-through cache which incorporates a line addressable locking mechanism. By executing a software lock instruction, microprocessor 12 is able to control the locking of individual cache lines in data cache 44. A locked cache line is not subject to deallocation. By locking a plurality of lines in the data cache 44, microprocessor 12 may configure a reserved area of guaranteed fast access memory within data cache 44. In addition, data cache 44 includes a mechanism to disable write-through of write requests on a line addressable basis. By executing a software write-through disable instruction, microprocessor 12 commands data cache 44 to disable write through operations on an individual cache line. By disabling write-through on cache lines which have been locked as described above, the plurality of locked lines behaves like a true fast-access internal memory: write requests targeting the reserved area of locked lines are not written through to bus interface unit 40 through second internal bus 62. Therefore, microprocessor 12 may advantageously configure a reserved area of guaranteed fast-access memory within said data cache 44 using addresses that do not physically exist in the external memory system (which includes system memory 18). Furthermore, the system bus 22, being liberated from the write through traffic corresponding to the reserved area, may advantageously operate with higher effective transfer bandwidth.

It is noted that data cache 44 which employs line addressable locking and line addressable disabling of write through operations may be included in microprocessors with a variety of architectures, and is not limited to the exemplary architecture given in FIG. 1.

Figure 2:
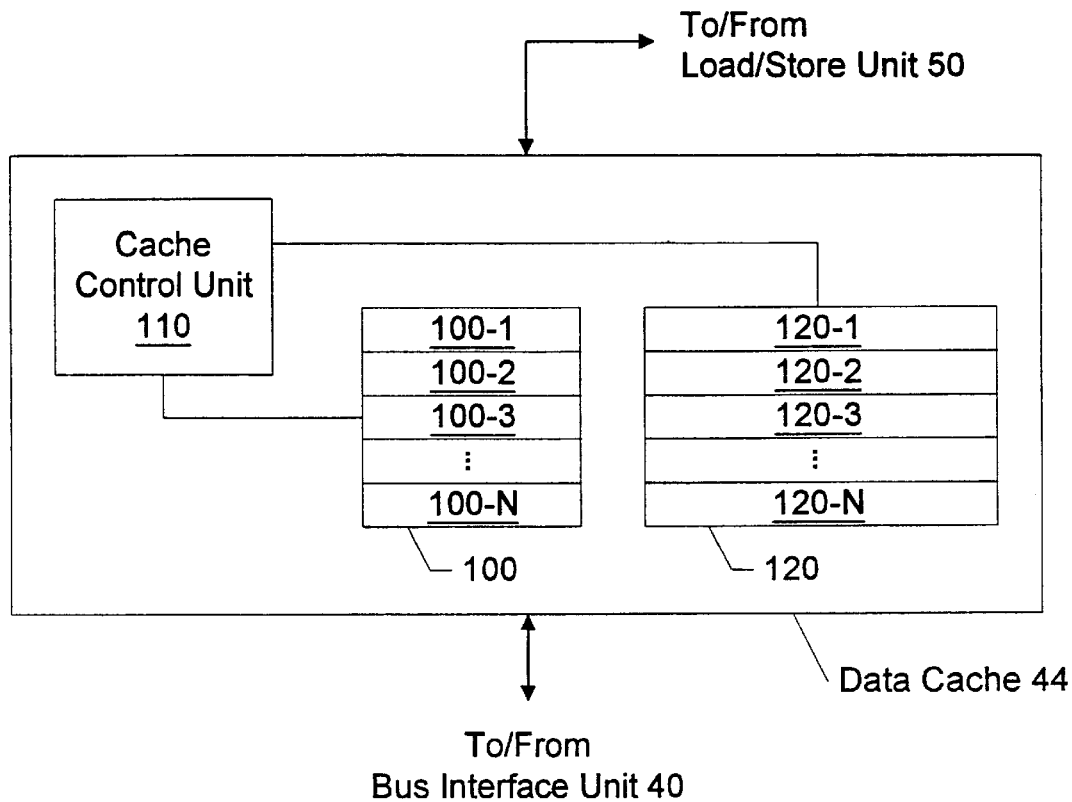
FIG. 2 is a block diagram of a data cache.

Referring now to FIG. 2, a block diagram of one embodiment of data cache 44 is shown. As illustrated, data cache 44 includes a cache controller 110, an address tag and state array 100, and a cache memory 120. Cache control unit 110 is coupled to address tag and state array 100 and cache memory 120. Cache memory 120 includes a plurality of cache lines 120-1 through 120-N. Each cache line, for example cache line 120-1, stores a predetermined number of words. Address tag and state array 100 includes a corresponding plurality of address tag and state entries 100-1 through 100-N. For example, address tag and state entry 100-1 corresponds to cache line 120-1; address tag and state entry 100-2 corresponds to cache line 120-2; and so forth.

Figure 3:
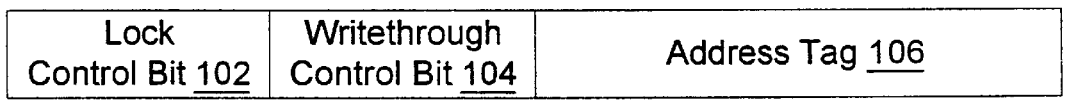
FIG. 3 is a diagram of the fields included in a generic address tag and state entry within the address tag and state array.

Referring now to FIG. 3, a diagram of the fields included in a generic address tag and state entry 100-I are shown. Address tag and state entry 100-I includes a lock control bit 102, a write-through control bit 104, and an address tag 106. Address tag 106 corresponds to cache line 120-I, and specifies which line of system memory 18 is imaged by the cache line 120-I. Lock control bit 102 takes one of two values denoted L or U for locked or unlocked respectively.

Lock control bit 102 determines whether or not the cache line 120-I is locked, i.e. subject to deallocation by cache control unit 110. Writethrough disable bit 104 takes one of two values denoted D or E for disable or enable respectively. When writethrough disable bit 104 takes the value D, write requests which hit cache line 120-I are not written through to bus interface unit 40 via second internal bus 62. Alternatively, when writethrough bit 104 takes the value E, write requests which hit cache line 120-I are written through to the bus interface unit 40.

As mentioned above, microprocessor 12 includes in its instruction set (a) a line lock instruction for reserving a line of cache memory 120, (b) a write-through disable instruction for disabling write-through operations on a cache line, and (c) an line unlock instruction for unlocking a cache line, i.e. restoring the line to the pool of lines subject deallocation by cache control unit 110. Each of these cache line control instructions preferably includes an address field for specifying a cache line whose state is to be altered. Upon receiving any one of these cache line control instructions, instruction decode unit 46 decodes the cache line control instruction and issue decoded representations of the cache line control instruction to load/store unit 50.

In response to a lock instruction, load/store unit 50 asserts a lock signal on first internal bus 60. Upon receiving a lock signal from load/store unit 50, cache control unit 110 (a) identifies the cache line 120-I whose address tag 106 matches the address supplied in the lock signal, and (b) sets the lock control bit 102 of the identified cache line to the locked state L. When the lock control bit 102 takes the value L, the corresponding cache line is not subject to deallocation and is thereby reserved in cache memory 120 and the corresponding address tag and state entry 100-I persists in the address tag and state array 100. In contrast, cache control unit 110 maintains unlocked lines according to a normal write-through cache replacement policy.

Furthermore, in response to a write-through disable instruction, load/store unit 50 asserts a write-through disable signal on first internal bus 60. Upon receiving a write-through disable signal from load/store unit 50, cache control unit 110 (a) identifies the cache line 120-J whose address tag 106 matches the address supplied in the write-through disable signal, and (b) sets the write-through control bit 104 of the identified cache line to the disabled state D. When the write-through control bit 104 takes the value D, write requests which hit the corresponding cache line 120-J are not presented to the bus interface unit 40. Thus, the external memory system (including system memory 18) may operate with increased efficiency since the unnecessary write-through traffic corresponding to disabled lines is eliminated.

Normally, write-through disabling is applied to lines which have previously been locked. In fact, in one embodiment of data cache 44, the lock control bit 102 is automatically set when the write-through disable bit 104 is set.

In response to an unlock instruction, load/store unit 50 asserts an unlock signal on first internal bus 60. Upon receiving a unlock signal from load/store unit 50, cache control unit 110 (a) identifies the cache line 120-I whose address tag 106 matches the address supplied in the unlock signal, and (b) sets the lock control bit 102 of the identified cache line to the unlocked state U. When the lock control bit 102 takes the value U, the corresponding cache line is restored to the pool of cache lines which are subject to deallocation.

It is noted that in one embodiment, microprocessor 12 additionally includes a block locking instruction which commands the locking of a plurality of consecutively addressed lines in the data cache 44. Such a block locking instruction may include an initial address argument and a numeric size argument to control the location and size of the block of lines to be locked. Similarly, microprocessor 12 may additionally include block oriented write-through disable and unlock instructions.

In certain situations, a software application may have a transient (i.e. temporary) need for high-speed internal memory capability. In this case, the software application may reserve a portion of data cache 44 by locking one or more lines without disabling write-through on these lines. Since write-through remains enabled for the locked lines, the locked lines are guaranteed to be coherent with system memory. When the software application no longer requires guaranteed high-speed access, the locked lines may be subsequently unlocked using the unlock instructions.

In contrast, when a software application has a permanent (or long-term) need for high-speed memory capability, the software application may reserve a portion of data cache 44 by locking one or more cache lines and also disabling write-through on these lines. Since, the reserved portion of data cache 44 never passes write accesses through to bus interface unit 40, the addresses corresponding to the reserved area need not correspond to physical memory in the external memory system, and system bus 22 may operate with increased efficiency.

Figures 4, 5:
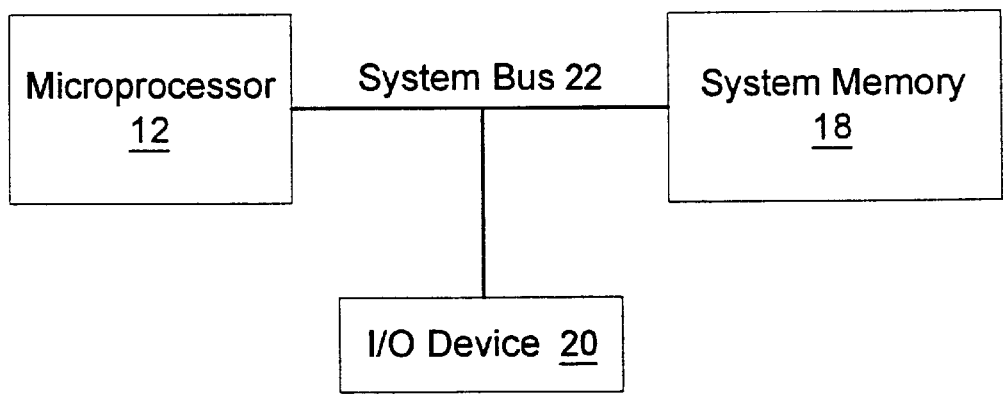
FIG. 4 is a diagram of an address tag and state array.
FIG. 5 is a block diagram of an exemplary computer system employing the microprocessor of FIG. 1.

Referring now to FIG. 4, a diagram of the address tag and state array 100 is shown. In an initial state, e.g. after power is applied to microprocessor 12, all entries in the address tag and stage array resemble address tag and state entry 100-2. In other words, all lock control bits 102 are set to the unlocked state u, and all write-through disable bits 104 are set to the enabled state E. Thus, every cache line in cache memory 120 is available for normal write-through cache usage and is subject to deallocation.

In a data loading phase, microprocessor 12 running under the control of a software application (or operating system), stores a set of critical data values into data cache 44, for example by fetching and executing one or more memory load instructions. Once the desired data has been stored within data cache 44, the cache lines corresponding to the critical data are locked by executing one or more lock instructions. After the execution of a lock instruction, a locked cache line has an address tag and state entry resembling address tag and state entry 100-3, i.e. the lock control bit 102 is set to the locked state L, and the write-through control bit 104 is set to the enabled state E.

Once the critical data has been locked in data cache 44, microprocessor 12 may fetch and execute one or more write-through disable instructions to prevent write requests which hit the critical data area from being written through to the bus interface unit 40. After the execution of a write-through disable instruction, a disabled line has an address tag and state entry resembling address tag and state entry 100-1, i.e. the lock control bit 102 is set to the locked state L, and the write-through control bit 104 is set to the disabled state D. After locking and disabling write-through on the critical data area, the software application may proceed to use the critical data area as a guaranteed fast access internal memory. In fact, the access time to the critical data area is equal to the cache hit access time.

It is noted that in one embodiment, once the disable bits have been set, they will not be reset during normal operation. The lock control bit and write-through disable bits may be reset upon re-initialization of the system, or if the corresponding data is no longer needed and can be discarded.

Since the locking and write-through disable mechanisms operate under software control, a software developer may optimize the division of cache memory 120 between normal cache usage and fast access reserved memory according to anticipated needs. The granularity of this division is the size of one data cache line. Even the extreme cases where the entire cache memory 120 is used for either normal cache operation or fast access reserved memory can easily be achieved.

Furthermore, it is noted that the address range for the fast access reserved memory can be controlled by software with no extra hardware implementation by programming the address tags with the required addresses. The fast access reserved memory may even be given address values which do not correspond to any physical memory in the external memory system (including system memory 18), since no accesses to this particular address range will ever appear at the bus interface unit 40.

A microprocessor employing data cache 44 circumvents the need for a separate high-speed RAM internal or external to the microprocessor. The need for high-speed memory is satisfied by the data cache 44. If a software application demands a critical data area with capacity larger than the capacity of the current data cache 44, the data cache 44 may be re-scaled to meet the greater demand with significantly smaller design cost than the cost of incorporating a separate high speed RAM on the microprocessor substrate. As mentioned above, the speed of the fast access reserved memory embedded in the data cache 44 may be identical to execution with a 100% hit rate within the data cache 44. This may provide memory access speeds which are as fast or faster than a separate RAM can achieve.

Although data cache 44 has been described above in terms of a data cache integrated into a microprocessor, it is contemplated that in other embodiments an external cache may be configured with the selective line locking and line addressable write-through disable mechanisms as described above.

Referring now to FIG. 5, a block diagram of an exemplary computer system employing microprocessor 12 is shown. Microprocessor 12 couples to system memory 18 and I/O device 20 through system bus 22. In one embodiment, microprocessor 12 may be an embedded processor. In this case, an embedded software application running on microprocessor 12 configure a reserved area of guaranteed fast access memory with data cache 44 as explained above. I/O device 20 representative of any combination of I/O devices which are usable in an embedded application, e.g. sensing/measuring devices, actuating devices, display devices, etc. In an alternate embodiment, computer system comprises a general purpose computer.

It is noted that the lock control bit 102 and write-through disable bit 104 may be controlled in ways other than the software lock instruction, write-through disable instruction, and unlock instruction described above. For example, in one embodiment, a table may be maintained in system memory which stores cache configuration information for a particular memory area. This information is loaded into the cache, and used to control the lock control bit 102 and write-through disable bit 104 for lines and/or groups of lines corresponding to the particular memory area.

Numerous variations and modifications will become apparent to those skilled in the art once the above disclosure is fully appreciated. It is intended that the following claims be interpreted to embrace all such variations and modifications.

What is claimed is:

1. A data cache comprising:

a first bus;

a second bus;

a cache memory including a plurality of lines;

a cache controller coupled to said first bus, said second bus, and said cache memory;

wherein said cache controller is configured to receive a first lock signal from said first bus, and in response to said lock signal to lock a first line of said plurality of lines in said cache memory by setting a first lock indication control bit associated with said first line;

wherein said cache controller is configured to receive a first write request asserted on said first bus, wherein said first write request includes a first address and first data, wherein said cache controller is configured to update said first line with said first data if said first address matches an address tag associated with said first line;

wherein said cache controller is configured to selectively write through to said second bus write requests which hit said first line depending on whether a write-through control bit associated with said first line is set, wherein said write-through control bit is distinct from said first lock indication control bit such that said cache controller will write through to said second bus requests that hit lines whose associated first lock control bit is set but whose write-through control bit is not set.

2. The data cache of claim 1, wherein said cache controller is further configured to receive a first disable signal provided on said first bus, and in response to said first disable signal to set said first control indication if a disable address value provided with said first disable signal matches said address tag associated with said first line, wherein said setting of said first control indication disables write through of write requests which hit said first line.

3. The data cache of claim 2, wherein said first control indication is a write-through control bit.

4. The data cache of claim 1, wherein said first lock indication is a first lock control bit.

5. The data cache of claim 1, wherein said cache controller is configured to receive a first unlock signal from said first bus, and in response to said unlock signal to unlock said first line by resetting said first lock indication associated with said first line if an address value provided with said unlock signal matches the address tag associated with said first line.

6. The data cache of claim 2, wherein said cache controller is configured to lock a plurality of lines of said cache memory including said first line in response to a plurality of lock signals provided on said first bus, wherein said cache controller is further configured to selectively enable or disable write-through operations on said plurality of lines depending on a plurality of control indications associated with said plurality of lines.

7. The data cache of claim 6, wherein said cache controller is configured to receive a plurality of disable signals from said first bus, and in response to said disable signals to set each of said plurality of control indications to disable write-through operations on said plurality of lines.

8. The data cache of claim 1, wherein said second bus is coupled to a system memory, wherein said system memory is configured to update a system memory array in response to write requests which are written through to said second bus by said cache controller.

9. The data cache of claim 8, wherein said address tag associated with said first line corresponds to addresses which are not included in the address space of said system memory.

10. The data cache of claim 1, wherein said first bus is coupled to a load/store unit, wherein said load store unit is configured to assert write requests including said first write request on said first bus.

11. The data cache of claim 1, wherein said cache controller maintains unlocked lines in said cache memory according to a write-through cache replacement policy.

* * * * *